（12） United States Patent
Bourgeois et al.

(10) Patent No.: US 10,816,139 B2
(45) Date of Patent: Oct. 27, 2020

(54) METHOD AND DEVICE FOR FILLING A TANK WITH PRESSURIZED GAS

(71) Applicant: L'Air Liquide, Societe Anonyme pour l'Etude et l'Exploitation des Procedes Georges Claude, Paris (FR)

(72) Inventors: Thomas Bourgeois, Paris (FR); Fouad Ammouri, Massy (FR)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 10 days.

(21) Appl. No.: 16/343,058

(22) PCT Filed: Oct. 16, 2017

(86) PCT No.: PCT/FR2017/052835
§ 371 (c)(1),
(2) Date: Apr. 18, 2019

(87) PCT Pub. No.: WO2018/073520
PCT Pub. Date: Apr. 26, 2018

(65) Prior Publication Data
US 2019/0277449 A1 Sep. 12, 2019

(30) Foreign Application Priority Data
Oct. 19, 2016 (FR) .................................... 16 60131

(51) Int. Cl.
F17C 5/06 (2006.01)

(52) U.S. Cl.
CPC ........ F17C 5/06 (2013.01); F17C 2201/0109 (2013.01); F17C 2201/0119 (2013.01);
(Continued)

(58) Field of Classification Search
CPC .................. F17C 5/06; F17C 2260/026; F17C 2260/023; F17C 2260/025;
(Continued)

(56) References Cited

U.S. PATENT DOCUMENTS 5,641,005 A    6/1997  Kountz et al.
7,059,364 B2 * 6/2006  Kountz .................... F17C 9/02
                                                141/197
(Continued)

FOREIGN PATENT DOCUMENTS

FR    2 884 592    10/2006
FR    2 896 028    7/2007
(Continued)

OTHER PUBLICATIONS

International Search Report and Written Opinion for PCT/FR2017/052835, dated Dec. 15, 2017.
(Continued)

Primary Examiner — Nicolas A Arnett
(74) Attorney, Agent, or Firm — Christopher J. Cronin

(57) ABSTRACT

Method for filling a tank with pressurized gas to a target pressure from at least one pressurized gas source via a transfer pipe provided with at least one valve, the tank having a predetermined inner length and predetermined inner diameter, the end of the transfer pipe forming an injector with a predetermined injection diameter; said method comprises a step for transferring pressurized gas from the source to the tank at a predetermined flow rate, the method comprising a step of controlling the transfer of gas from the source to the tank to reduce the heat produced in the tank, the step of controlling the transfer of gas comprising at least one of: sizing of the injection diameter, and sizing of
(Continued)

the flow rate of the transferred gas; the control step being carried out according to the ratio L/D between the length and the diameter of the tank.

18 Claims, 1 Drawing Sheet

(52) U.S. Cl.
CPC .. *F17C 2201/035* (2013.01); *F17C 2201/054* (2013.01); *F17C 2201/056* (2013.01); *F17C 2201/058* (2013.01); *F17C 2205/013* (2013.01); *F17C 2221/012* (2013.01); *F17C 2223/0123* (2013.01); *F17C 2223/036* (2013.01); *F17C 2225/0123* (2013.01); *F17C 2225/0161* (2013.01); *F17C 2225/036* (2013.01); *F17C 2225/041* (2013.01); *F17C 2225/043* (2013.01); *F17C 2227/0157* (2013.01); *F17C 2227/04* (2013.01); *F17C 2250/032* (2013.01); *F17C 2250/0615* (2013.01); *F17C 2250/0636* (2013.01); *F17C 2250/0694* (2013.01); *F17C 2260/023* (2013.01); *F17C 2260/025* (2013.01); *F17C 2260/026* (2013.01); *Y02E 60/321* (2013.01)

(58) Field of Classification Search
CPC ........ F17C 2205/013; F17C 2201/0109; F17C 2201/0119; F17C 2201/035; F17C 2201/054; F17C 2201/056; F17C 2201/058; F17C 2221/012; F17C 2223/0123; F17C 2223/036; F17C 2225/0123; F17C 2225/0161; F17C 2225/036; F17C 2225/041; F17C 2225/043; F17C 2227/0157; F17C 2227/04; F17C 2250/032; F17C 2250/0615; F17C 2250/0636; F17C 2250/0694; Y02E 60/321

See application file for complete search history.

(56) References Cited

U.S. PATENT DOCUMENTS

| | | | | |
|---|---|---|---|---|
| 8,286,670 | B2* | 10/2012 | Faudou | F17C 5/06 141/192 |
| 8,783,303 | B2* | 7/2014 | Harty | F17C 5/007 141/11 |
| 9,222,620 | B2* | 12/2015 | Harty | F17C 5/007 |
| 9,347,614 | B2* | 5/2016 | Mathison | F17C 5/06 |
| 9,605,804 | B2* | 3/2017 | Mathison | F17C 5/06 |
| 10,295,121 | B2* | 5/2019 | Handa | F17C 13/028 |
| 10,571,076 | B2* | 2/2020 | Wistoft-Ibsen | F17C 5/06 |
| 2009/0107577 | A1* | 4/2009 | Allidieres | F17C 13/025 141/1 |
| 2011/0303320 | A1* | 12/2011 | Del-Gallo | C04B 28/18 141/1 |
| 2012/0318378 | A1* | 12/2012 | Yahashi | B60K 15/077 137/334 |
| 2018/0112828 | A1* | 4/2018 | Bourgeois | F17C 13/026 |
| 2019/0003647 | A1* | 1/2019 | Brachmann | F17C 5/06 |

FOREIGN PATENT DOCUMENTS

| | | |
|---|---|---|
| FR | 3 027 999 | 5/2016 |
| GB | 2 127 533 | 4/1984 |

OTHER PUBLICATIONS

French Search Report and Written Opinion for FR 1 660 131, dated Jun. 9, 2017.

Barral, et al, "Thermal effects of fast filling hydrogen compression in refueling stations", Proceedings of 15th World Hydrogen Energy Conference, Yokohama Japan, Jun. 2004.

* cited by examiner

METHOD AND DEVICE FOR FILLING A TANK WITH PRESSURIZED GAS

CROSS-REFERENCE TO RELATED APPLICATIONS

This application is a § 371 of International PCT Application PCT/FR2017/052835, filed Oct. 16, 2017, which claims § 119(a) foreign priority to French patent application FR 1660131, filed Oct. 19, 2016.

BACKGROUND

Field of the Invention

The invention relates to a method and a device for filling a tank with pressurized gas.

The invention relates more particularly to a method for filling a tank with pressurized gas to a target pressure from at least one pressurized gas source connected to the tank via a transfer pipe provided with at least one valve, the tank having a cylindrical shape of predetermined inner length and of predetermined inner diameter, the end of the transfer pipe connected to the tank forming an injector opening into the tank with a predetermined injection diameter, wherein the method comprises a step of transferring the pressurized gas from the source to the tank at a predetermined flow rate, the method comprising a step of regulating the transfer of gas from the source to the tank to reduce the heating produced in the tank.

Related Art

The rapid filling of tanks with pressurized gas, in particular hydrogen, causes a heating of the gas and of the tank. This heating must be controlled in order not to damage the tank (in particular in the case of a composite tank).

Known solutions consist in cooling the transferred gas (cf. for example U.S. Pat. No. 5,641,005) or in controlling the filling flow rate (cf. for example FR2896028A1). It is known in particular to provide filling rate ramps adapted for example to the filling conditions (filling rate as a function of, for example, the ambient temperature and the target pressure).

The heating in the tank during the filling is a phenomenon which is complex to model (cf. for example the article by K. Barral, S. Pregassame, and P. Renault, "Thermal effects of fast filling hydrogen compression in refueling stations", Proceedings of 15th World Hydrogen Energy Conference, Yokohama Japan, June 2004).

Thus, the temperature of the gas and of the tank can be very heterogeneous within the tank. The inventors have in particular demonstrated that regions of the tank can have a temperature much greater than the average temperature of the tank or of the gas that is calculated or measured.

A known solution for solving this problem consists in reducing the flow rate and hence the pressure ramp in order to reduce the average temperature of the gas. However, this increases the filling time and does not necessarily eliminate the heat peaks at certain locations. Specifically, in certain situations, this can even increase the heating: by decreasing the flow rate, the heterogeneities can be increased and hence the maximum temperature of the gas can be increased.

Another solution consists in increasing the cooling of the gas in order to reduce the average temperature of the gas. This significantly increases the cost of the installation and the cost of the gas provided (hydrogen, for example).

SUMMARY OF THE INVENTION

One objective of the present invention is to mitigate all or some of the drawbacks of the prior art that are set out above.

To this end, the method according to the invention, otherwise conforming to the generic definition given thereof by the preamble above, is essentially characterized in that the step of regulating the gas transfer comprises at least one among: a sizing of the injection diameter, a sizing of the flow rate of transferred gas; the regulating step being carried out as a function of the ratio L/D between the length and the diameter of the tank.

According to the invention, this regulation of the gas transfer is therefore adapted as a function of the geometry of the tank and makes it possible to reduce the temperature heterogeneities in the tank. By reducing this heterogeneity, the maximum temperature achieved by the gas or the tank is thus also decreased.

The inventors have in particular observed that this makes it possible to limit the phenomena of stratification and of heterogeneity of the temperatures of the gas within the tank.

This makes it possible to fill tanks under increased safety conditions. This can potentially make it possible to optimize other measures for controlling the final temperature of the gas in the tank (such as, for example, the reduction of the cooling of the gas).

Specifically, the method according to the invention can possibly be applied in addition to other measures for controlling the temperature (cooling of the gas, pressure rise curves, etc.).

Moreover, some embodiments of the invention may include one or more of the following features:

- when the ratio L/D between the length and the diameter of the tank is less than a first predetermined threshold, which is between two and four and preferably equal to three, the regulating step consists in maintaining the ratio ($Q/D1^2$) between the mass flow rate of the transferred gas and the square of the injection diameter above a second predetermined threshold,
- the regulating step consisting in maintaining the ratio $Q/D1^2$ above a second predetermined threshold comprises at least one among: an increase of the flow rate of transferred gas, a decrease of the injection diameter,
- the step of regulating the gas transfer is carried out as a function of the filling target pressure of the tank,
- the second predetermined threshold is a function of the filling target pressure of the tank,
- the second threshold increases when the filling target pressure of the tank increases,
- the gas is hydrogen and, when the filling target pressure of the tank is between 700 and 900 bar, the second threshold is between 175 and 225 $kg \cdot m^{-2} \cdot s^{-1}$ and preferably equal to 200 kg.
- when the ratio L/D between the length and the diameter of the tank is greater than the first predetermined threshold, the regulating step consists in maintaining the ratio $Q/D1^2$ above the second predetermined threshold and below a third predetermined threshold,
- the regulating step consisting in maintaining the ratio $Q/D1^2$ above a second predetermined threshold and below the third predetermined threshold comprises at least one among: an increase or a decrease of the flow rate of transferred gas, an increase or a decrease of the injection diameter, when the filling target pressure of the tank is between 700 and 900 bar, the third threshold is between 1200 and 1600 kg·m$^{-2}$·s$^{-1}$ and preferably equal to 1400 kg·m$^{-2}$·s$^{-1}$, when the filling target pressure of the tank is between 700 and 900 bar, the third threshold is between 1200 and 1600 kg·m$^{-2}$·s$^{-1}$ and preferably equal to 1400 kg.

the step of regulating the gas transfer is carried out before or at the start of the gas transfer, that is to say that the sizing of the injection diameter and/or the sizing of the flow rate of transferred gas is fixed before the start of the filling, when the gas is hydrogen and the filling target pressure of the tank is between 200 and 300 bar, the second threshold is between 75 and 100 kg·m$^{-2}$·s$^{-1}$ and preferably equal to 85 kg.

when the gas is hydrogen and the filling target pressure of the tank is between 300 and 400 bar, the second threshold is between 100 and 140 kg·m$^{-2}$·s$^{-1}$ and preferably equal to 120 kg.

when the gas is hydrogen and the filling target pressure of the tank is between 450 and 600 bar, the second threshold is between 140 and 175 kg·m$^{-2}$·s$^{-1}$ and preferably equal to 160 kg.

the tank is arranged horizontally during the transfer of gas into its interior via the injector.

The invention also relates to a device for filling tanks with pressurized gas to a target pressure, comprising a pressurized gas source, a pipe for transferring the gas from the source that is provided with at least one valve and intended to be connected to a tank, the end of the transfer pipe intended to be connected to the tank forming an injector having a predetermined injection diameter, the device comprising an electronic member for controlling the filling that serves to control the at least one valve, the electronic control member being configured to receive, store and process data and in particular to receive dimensional characteristics of the tank to be filled, namely the inner length and the inner diameter of the tank or the ratio L/D between the latter, the electronic control member being also configured to compare the ratio L/D with at least one threshold and, as a function thereof, to modify or signal the need to modify at least one filling parameter among: the injection diameter, the flow rate of transferred gas as a function of the ratio.

The invention may also relate to any alternative device or method comprising any combination of the features above or below.

BRIEF DESCRIPTION OF THE FIGURES

Further particular features and advantages will become apparent from reading the following description, given with reference to the figures, in which.

DETAILED DESCRIPTION OF THE INVENTION

Figure 1:
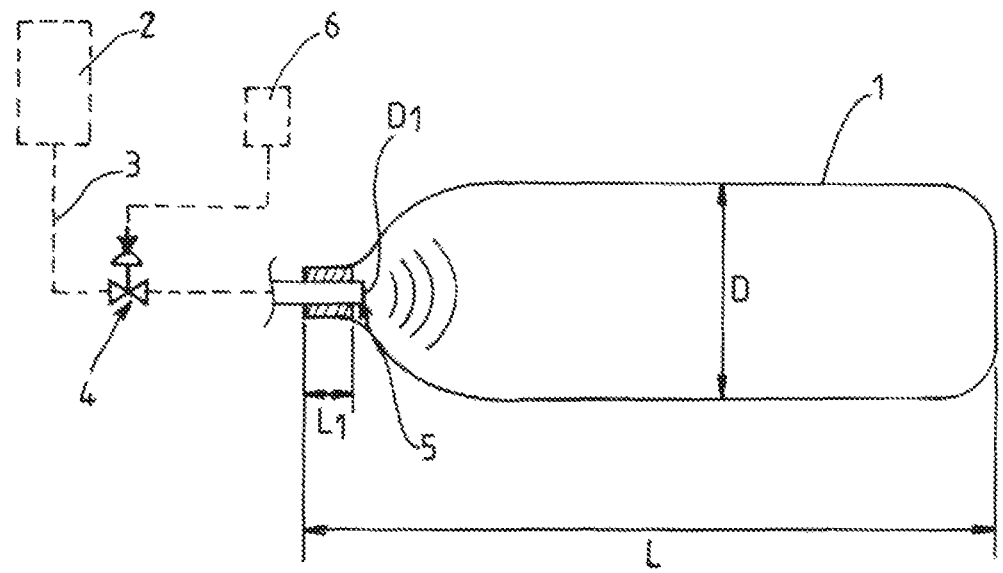
FIG. 1 represents a schematic and partial side view illustrating an example of the structure and operation of a filling device according to the invention, FIG. 2 schematically and partially represents an example of the operation of such a filling method.

As illustrated in FIG. 1, the filling of tanks 1 with pressurized gas can be implemented by a filling device (or station) comprising a pressurized gas source 2, a gas transfer pipe 3 connected to the source 2 and provided with at least one valve 4 for controlling the flow rate. The transfer pipe 3 comprises at least one end intended to be connected to a tank 1 to be filled.

Conventionally, the pressurized gas source 2 can comprise at least one among: one or more pressurized gas tanks, at least one compressor, a source of liquefied gas and a vaporizer, etc.

The end of the transfer pipe 3 intended to be connected to the tank 1 forms or comprises an injector 5 having a predetermined injection diameter D1. The device preferably additionally comprises an electronic member 6 for controlling the filling that serves to control the at least one valve 4 and/or other members of the filling device.

The device is configured or used to fill a tank 1 with pressurized gas to a target pressure, for example 250 bar or 350 bar or 500 bar or 700 bar or more, in particular 800 or 900 bar.

The device is in particular intended for preferably filling cylindrical tanks 1 in the horizontal position (that is to say lying down along their longitudinal direction).

The tanks 1 have a cylindrical shape of predetermined inner length L and of predetermined inner diameter D.

The end of the transfer pipe 3 is connected at an orifice situated at a longitudinal end of the tank 1.

According to the invention, the transfer of pressurized gas from the source 2 and the interior of the tank 1 is carried out at a predetermined flow rate Q (in particular a mass flow rate).

According to the invention, the transfer of gas from the source 2 to the tank 1 is adapted to reduce the heating produced in the tank 1. This adaptation of the gas transfer comprises at least one among a sizing of the injection diameter D1, a sizing of the flow rate Q of transferred gas, and this modification is carried out as a function of the ratio L/D between the length L and the diameter D of the tank 1.

Thus, this ratio L/D can delimit two types of tank 1, for example so-called "short" tanks (L/D below a first threshold S1) and so-called "long" tanks (L/D above the first threshold S1).

Specifically, the inventors have identified that, as a function of this geometric criterion, it is possible to adapt the injection diameter D1 or the flow rate Q of transferred gas in order to successfully reduce the temperature heterogeneities of the gas in the tank 1, that is to say to reduce the excessively hot points during the filling.

Figure 2:
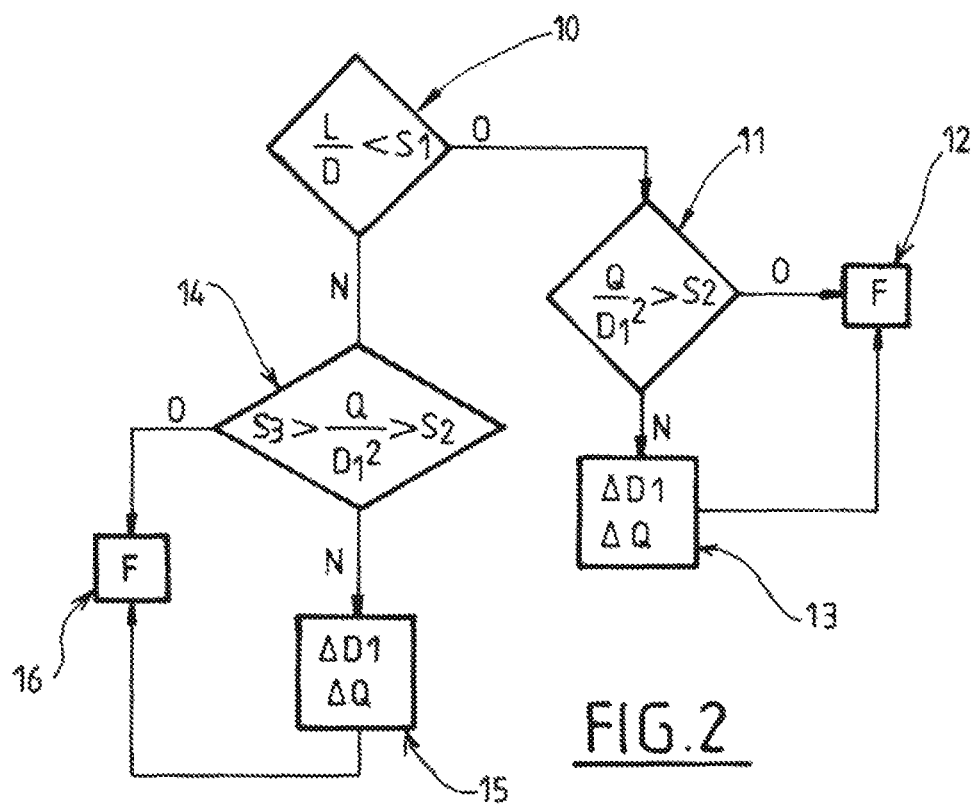

Thus, when the ratio L/D between the length L and the diameter D of the tank 1 is less than a first predetermined threshold S1, which is between two and four and preferably equal to three (cf. ref. 11, FIG. 2), the regulating step preferably consists in maintaining the ratio Q/D1$^2$ between the mass flow rate Q of the transferred gas and the square of the injection diameter D1 above a second predetermined threshold S2 (cf. ref. 11, FIG. 2). If this ratio Q/D1$^2$ is greater than the second threshold S2, the filling F can be carried out without risk of excessive heating (cf. ref. 12, FIG. 2).

Specifically, the ratio Q/D1$^2$=rho·π·V/4, where rho is the density of the gas and V is the average velocity of the gas at the injector, π being the constant pi equal to 3.14159.

Rho is tabulated for each gas as a function of its temperature and of its pressure. In other words, fora given temperature and pressure, the density of the gas depends on its nature. Therefore, the ratio Q/D1$^2$ also depends on the nature of the gas.

The limit S2 is calculated with the velocity value V equal to 5 m/s under the end-of-filling conditions, and the limit S3 is calculated with the velocity value of 100 m/s for the start-of-filling conditions.

The thresholds S2 and S3 are preferably dependent on (or a function of) the filling target pressure of the tank 1 and preferably also on the nature of the gas.

For example, for filling with hydrogen:
when the filling target pressure of the tank 1 is between 200 and 300 bar, the second threshold S2 is between 75 and 100 $kg \cdot m^{-2} \cdot s^{-1}$ and preferably equal to 85 $kg \cdot m^{-2} \cdot s^{-1}$ when the filling target pressure of the tank 1 is between 300 and 400 bar, the second threshold S2 is between 100 and 140 $kg \cdot m^{-2} \cdot s^{-1}$ and preferably equal to 120 $kg \cdot m^{-2} \cdot s^{-1}$ when the filling target pressure of the tank 1 is between 450 and 600 bar, the second threshold S2 is between 140 and 175 $kg \cdot m^{-2} \cdot s^{-1}$ and preferably equal to 160 $kg \cdot m^{-2} \cdot s^{-1}$ when the filling target pressure of the tank 1 is between 700 and 900 bar, the second threshold (S2) is between 175 and 225 $kg \cdot m^{-2} \cdot s^{-1}$ and preferably equal to 200 $kg \cdot m^{-2} \cdot s^{-1}$.

Maintaining the ratio $Q/D1^2$ above a second predetermined threshold S2 can be easily carried out by adapting the injection diameter D1 (decreasing for example) and/or by adapting the filling mass flow rate Q (increasing for example), cf. ref. 13, FIG. 2. These operating conditions can be in particular fixed before the filling or modified before or during the filling in view of the geometry of the tanks 1 which will have to be filled at a predetermined pressure.

That is to say that, as a function of the (known) geometry of the tanks 1 and possibly of the target pressure, the injection diameter D1 and/or the filling ramp (mass flow rate) is (are) adapted to satisfy the recommendation above (cf. ref. 13, FIG. 2).

It should be noted that, when the injector 5 penetrates in the interior of the tank 1 over a distance L1, the expression L/D<S1 is preferably modified as follows: (L-L1)/D<S1 in order to take into account the actual length of progression of the injected gas.

For a first threshold S1 equal to three, (L-L1)<3D is obtained for the short tanks and (L-L1)>3D is obtained for the long tanks (cf. FIG. 1).

For these short tanks, the inventors have demonstrated that there are no or few horizontal heterogeneities of temperatures owing, for example, to the fact that the injected gas jet does not laterally strike the walls of the tank (by virtue of the customary angle and shape of the gas jet of the injectors which are used).

The inventors have found that, in this geometric configuration, there is established, on the other hand, either a turbulent mixture regime or a vertically stratified regime in the tank 1. In a turbulent regime, the temperature is relatively very homogeneous (less than 3.5° C. between the average temperature and the maximum temperature of the inner wall for an injector of 6 mm in diameter or less than 5.5° C. for an injector diameter of 10 mm). On the other hand, in a vertically stratified regime there can be observed temperature gradients ranging up to 25° C., for example.

The inventors have demonstrated that the modification of the injection diameter and/or of the flow rate for maintaining the ratio $Q/D1^2$ above the second threshold S2 makes it possible to minimize the risks of establishing a vertically stratified regime. That is to say that, according to this recommendation, a turbulent mixture regime which minimizes the temperature heterogeneities is established. This goes against the recommendations of the prior art, which, by contrast, encouraged reducing the filling flow rate in order to limit the heating.

When the ratio L/D is greater than the first threshold S1, the regulating step preferably consists in maintaining the ratio $Q/D1^2$ above the second predetermined threshold S2 and below a third predetermined threshold S3 (cf. ref. 14, FIG. 2).

As above, the regulating step can comprise at least one among: an increase or a decrease of the flow rate Q of transferred gas, an increase or a decrease of the injection diameter D1, cf. ref. 15, FIG. 2. When this recommendation is satisfied, the filling F can be carried out without risk of excessive heating (cf. ref. 16, FIG. 2).

The inventors have demonstrated that the above regulations make it possible to control the gaseous regime in the long tank during filling. In particular, according to the invention the vertical and horizontal stratification regimes are reduced. That is to say that the temperature heterogeneities are also reduced for the long tanks via this regulation.

Thus, in the case of long tanks L/D>S1 or (L-L1)/D>S1, it is possible to define a ratio $Q/D1^2$ range which makes it possible to reduce the temperature heterogeneities during filling.

As above, the third predetermined threshold S3 is preferably dependent on (or a function of) the filling target pressure of the tank 1 and preferably also on the nature of the gas.

For example, for filling with hydrogen:
when the filling target pressure of the tank 1 is between 200 and 300 bar, the third threshold S3 is between 600 and 800 $kg \cdot m^{-2} \cdot s^{-1}$ and preferably equal to approximately 715 $kg \cdot m^{-2} \cdot s^{-1}$ when the filling target pressure of the tank 1 is between 300 and 400 bar, the third threshold S3 is between 800 and 1000 $kg \cdot m^{-2} \cdot s^{-1}$ and preferably equal to 900 $kg \cdot m^{-2} \cdot s^{-1}$ when the filling target pressure of the tank 1 is between 450 and 600 bar, the third threshold S3 is between 1000 and 1300 $kg \cdot m^{-2} \cdot s^{-1}$ and preferably equal to 1150 $kg \cdot m^{-2} \cdot s^{-1}$ when the filling target pressure of the tank 1 is between 700 and 900 bar, the third threshold S3 is between 1300 and 1500 $kg \cdot m^{-2} \cdot s^{-1}$ and preferably equal to 1400 $kg \cdot m^{-2} \cdot s^{-1}$.

Thus, in a preferred embodiment, when the filling of tanks is intended, depending on the geometry of the tanks (short or long) and the filling target pressure, the ratio $Q/D1^2$ is maintained above (and possibly below for S3) the above-defined thresholds. This is achieved by predefining the injection diameter and/or by adapting the filling mass flow rate. This reduces the heating problems by reducing the heterogeneity of the temperature of the gas and of the tank during the filling.

The calculations for complying with these operating conditions are relatively simple and can be readily performed by a calculator ora computer in order to predefine or adapt the operating conditions of a filling station.

In the case, for example, of filling with hydrogen at 700 bar of a short tank (L-Li)/D<3 having a volume of 30 liters that is initially provided with an injector diameter of 0.01 m and a mass flow rate of 0.004 kg/second, the calculation of the ratio $Q/D1^2$ gives the result 40 $kg \cdot m^{-2} \cdot s^{-1}$.

This is below the recommendation of approximately 200 $kg \cdot m^{-2} \cdot s^{-1}$ at least (or even 197 $kg \cdot m^{-2} \cdot s^{-1}$). In order to avoid or limit the stratification phenomena (hot points), two strategies are possible. According to a first strategy, it is possible to decrease the injection diameter D1 to 0.003 m, thus making it possible to obtain a ratio $Q/D1^2$ equal to 444 $kg \cdot m^{-2} \cdot s^{-1}$. A second strategy can consist in increasing the mass flow rate to 0.4 kg·s$^{-1}$, for example. The ratio Q/D1$^2$ then changes to 400 kg·m$^{-2}$·s$^{-1}$. This increase in the flow rate Q reduces the heterogeneities but can lead to an increase in the average temperature. In order to avoid this disadvantage, the two strategies above can be modulated and combined (smaller increase in the diameter and smaller increase in the flow rate), for example injection diameter D1=0.005 m and flow rate Q equal to 0.1 kg·s$^{-1}$. This makes it possible to achieve a ratio of 400 kg·m$^{-2}$·s$^{-1}$.

The filling conditions associated with the examples above can be the following: a gas temperature of 0° C. for a filling at 350 bar, −20° C., −40° C. for a filling at 500 or 700 bar. The final filling velocity can be at least 5 m/s.

For example, an electronic storage member 6 for the acquisition and processing of data that forms part of the station or is remote from said station can be used. This electronic member 6 can, where appropriate, serve to control at least one element of the station, for example the at least one valve 4 of the transfer pipe (for example to regulate the transferred flow rate).

The invention is particularly adapted to the fillings of tanks 1 arranged horizontally during the filling (horizontal cylindrical generatrices of the portion). Moreover, the invention is particularly adapted to the fillings of tanks having ratios L/D of, for example, between 1.4 and 6.6. Moreover, these measures apply particularly well to injectors having a diameter of between 3 and 25 mm. Of course, other geometries or configurations of fillings are possible (vertical ones, different dimensions), where appropriate with lesser advantages or requiring small adaptations (thresholds, etc.).

By "regulation of the gas transfer" is meant in particular a (for example dynamic) control or a predetermined sizing of the filling conditions (D1 and/or Q in particular).

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A method for filling a tank with pressurized gas to a target pressure from at least one pressurized gas source connected to the tank via a transfer pipe provided with at least one valve, the tank having a cylindrical shape of predetermined inner length L and of predetermined inner diameter D, the end of the transfer pipe connected to the tank forming an injector opening into the tank with a predetermined injection diameter D1, wherein the method comprises a step of transferring the pressurized gas from the source to the tank at a predetermined flow rate Q, the method comprising a step of regulating or of sizing the transfer of gas from the source to the tank to reduce the heating produced in the tank, characterized in that the step of regulating or sizing the gas transfer comprises at least one among: a sizing of the injection diameter D1 and a sizing of the flow rate Q of transferred gas; the step of regulating or sizing the gas transfer being carried out as a function of a ratio L/D.

2. The method of claim 1, further comprising a step of determining or calculating the L/D and a step of comparing the determined or calculated L/D with a first predetermined threshold S1.

3. The method of claim 2, further comprising a step of regulating a ratio, Q/D1$^2$, that is achieved by controlling Q and/or sizing D1 as a function of said step of comparing.

4. The method of claim 3, wherein Q/D1$^2$ is maintained above a second predetermined threshold S2 when L/D is less than S1.

5. The method of claim 4, wherein S1 is between two and four.

6. The method of claim 5, wherein S1 is three.

7. The method of claim 3, wherein Q/D1$^2$ is maintained above S2 by increasing Q and/or decreasing D1.

8. The method of claim 7, wherein the second predetermined threshold S2 is a function of a filling target pressure of the tank.

9. The method of claim 8, wherein S2 increases when the filling target pressure of the tank increases.

10. The method of claim 8, wherein the gas is hydrogen and, when the filling target pressure of the tank is between 700 and 900 bar, S2 is between 175 and 225 kg·m$^{-2}$·s$^{-1}$.

11. The method of claim 10, wherein S2 is equal to 200 kg·m$^{-2}$·s$^{-1}$.

12. The method of claim 2, wherein Q/D1$^2$ is maintained above a second predetermined threshold S2 and below a third predetermined threshold S3 when L/D is greater than S1.

13. The method of claim 12, Q/D1$^2$ is maintained above S2 and below S3 by at least one of:
increasing or decreasing Q, and
increasing or decrease D1.

14. The method of claim 13, wherein, when the filling target pressure of the tank is between 700 and 900 bar, S3 is between 1200 and 1600 kg·m$^{-2}$·s$^{-1}$.

15. The method of claim 14, wherein S3 is equal to 1400 kg·m$^{-2}$·s$^{-1}$.

16. The method of claim 1, wherein said step of regulating or sizing is also carried out as a function of a filling target pressure of the tank.

17. A device for filling tanks with pressurized gas to a target pressure, comprising a pressurized gas source, a transfer pipe, and a computer, wherein:
- the transfer pipe has an end that is adapted and configured to be connected to a tank to be filled, thereby forming an injector having a predetermined injection diameter D1;
- the transfer pipe is adapted and configured to transfer the gas from the source to the tank;
- the transfer pipe is provided with at least one valve;
- the computer is adapted and configured to receive, store and process data;
- the computer is adapted and configured to control a filling of the tank with the gas of the source by controlling the at least one valve;
- the computer is adapted and configured to receive or calculate a ratio of a length L of the tank to be filled to a diameter D of the tank to be filled;
- the computer is adapted and configured to compare L/D with a first threshold S1, and as a function of said comparison, modify or signal a need to modify at least one parameter associated with filling the tank to be filled, said at least one parameter being D1, a flow rate Q of gas to be transferred from the source to the tank to be filled, of both D1 and Q.

18. The device of claim 17, the computer is adapted and configured to establish or modify Q and/or D1 in order to maintain a ratio $Q/D1^2$ above a second predetermined threshold S2 and/or maintain $Q/D1^2$ in a range of from S2 to a third predetermined threshold S3.

* * * * *